United States Patent [19]
Safarik et al.

[11] Patent Number: 6,112,712
[45] Date of Patent: Sep. 5, 2000

[54] MOTORCYCLE CAM DRIVE TENSIONER

[75] Inventors: David A. Safarik, Muskego; Jeffrey P. Coughlin, Germantown; Marc D. McAllister, Milwaukee, all of Wis.

[73] Assignee: Harley-Davidson Motor Company, Milwaukee, Wis.

[21] Appl. No.: 09/121,999

[22] Filed: Jul. 24, 1998

[51] Int. Cl.[7] .................................................. F16H 7/08
[52] U.S. Cl. ...................... 123/90.31; 267/155; 267/179; 474/111
[58] Field of Search ........................ 123/90.31; 474/111; 267/179, 155

[56] References Cited

U.S. PATENT DOCUMENTS

| | | | |
|---|---|---|---|
| 3,358,522 | 12/1967 | Poyser et al. | |
| 4,530,681 | 7/1985 | Kurata et al. | 474/111 |
| 4,746,105 | 5/1988 | Allison | 267/174 |
| 5,368,283 | 11/1994 | Pavlin | 267/155 |
| 5,489,243 | 2/1996 | Watanabe | 474/135 |
| 5,542,505 | 8/1996 | Kempf | 188/77 W |
| 5,647,812 | 7/1997 | McDonald et al. | 474/111 |
| 5,653,652 | 8/1997 | Simpson | 474/110 |
| 5,799,931 | 9/1998 | Kish | 267/155 |
| 5,899,181 | 5/1999 | Kurata et al. | 123/90.17 |

OTHER PUBLICATIONS

Harley–Davidson, Inc. 1993 and 1994 1340cc Models Parts Catalog–p. 58.

*Primary Examiner*—Terry M. Argenbright
*Assistant Examiner*—Hai Huynh
*Attorney, Agent, or Firm*—Michael Best & Friedrich LLP

[57] ABSTRACT

A motorcycle engine comprising an engine housing, a crankshaft mounted for rotation within the housing, a camshaft mounted for rotation within the housing, a flexible element (e.g., a chain) coupling the camshaft to the crankshaft, and a tensioner mounted adjacent the flexible element. The tensioner includes a support member, a shoe made of a polyimide polymer (e.g., Vespel), and a biasing member biasing the support member so that the shoe is in contact with the flexible element. The biasing member is made from a wire having a quadrangular (e.g., square) cross section. Preferably, the camshaft is supported by a cam support plate, and the support member is pivotally mounted to the cam support plate.

9 Claims, 3 Drawing Sheets

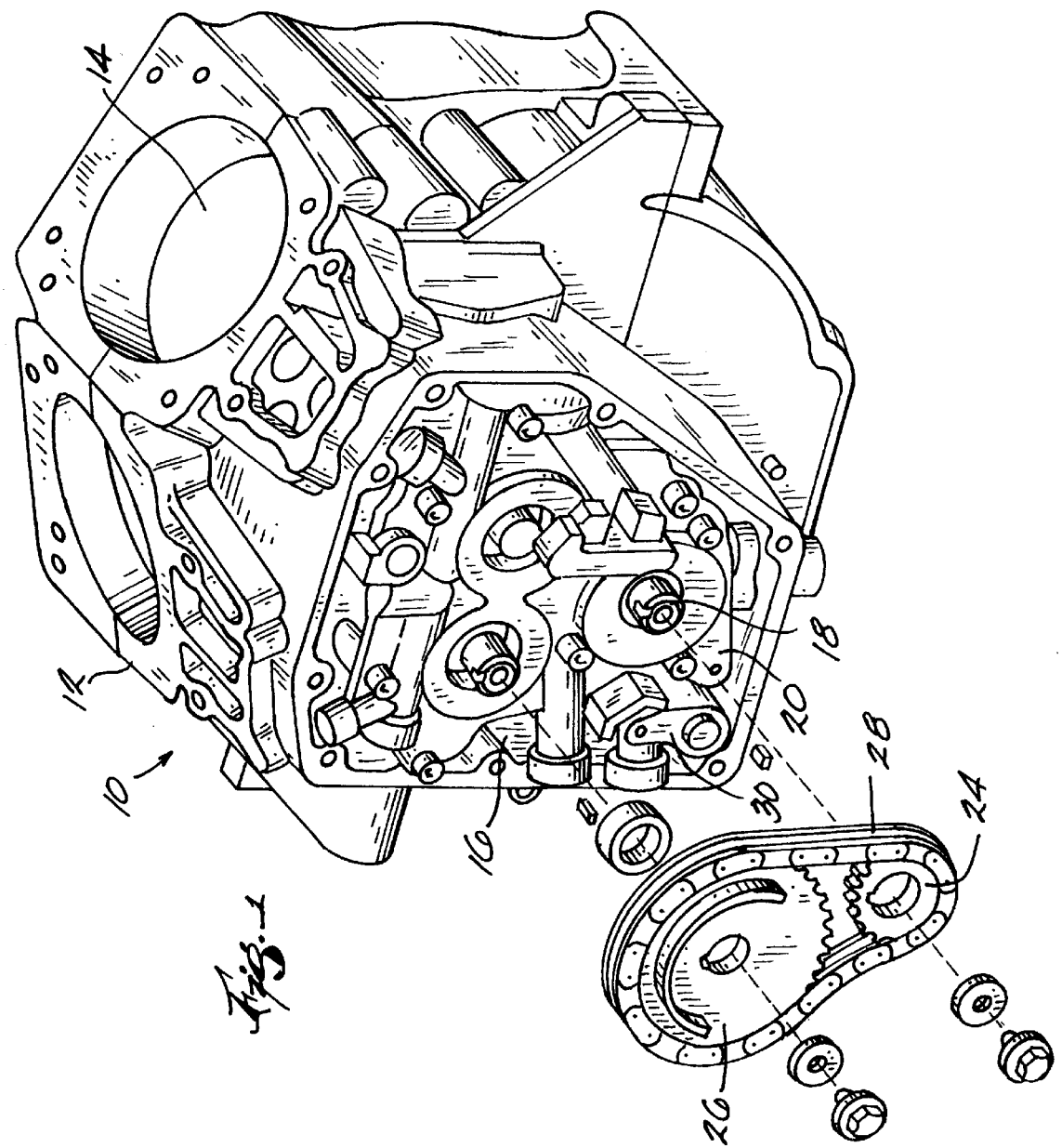

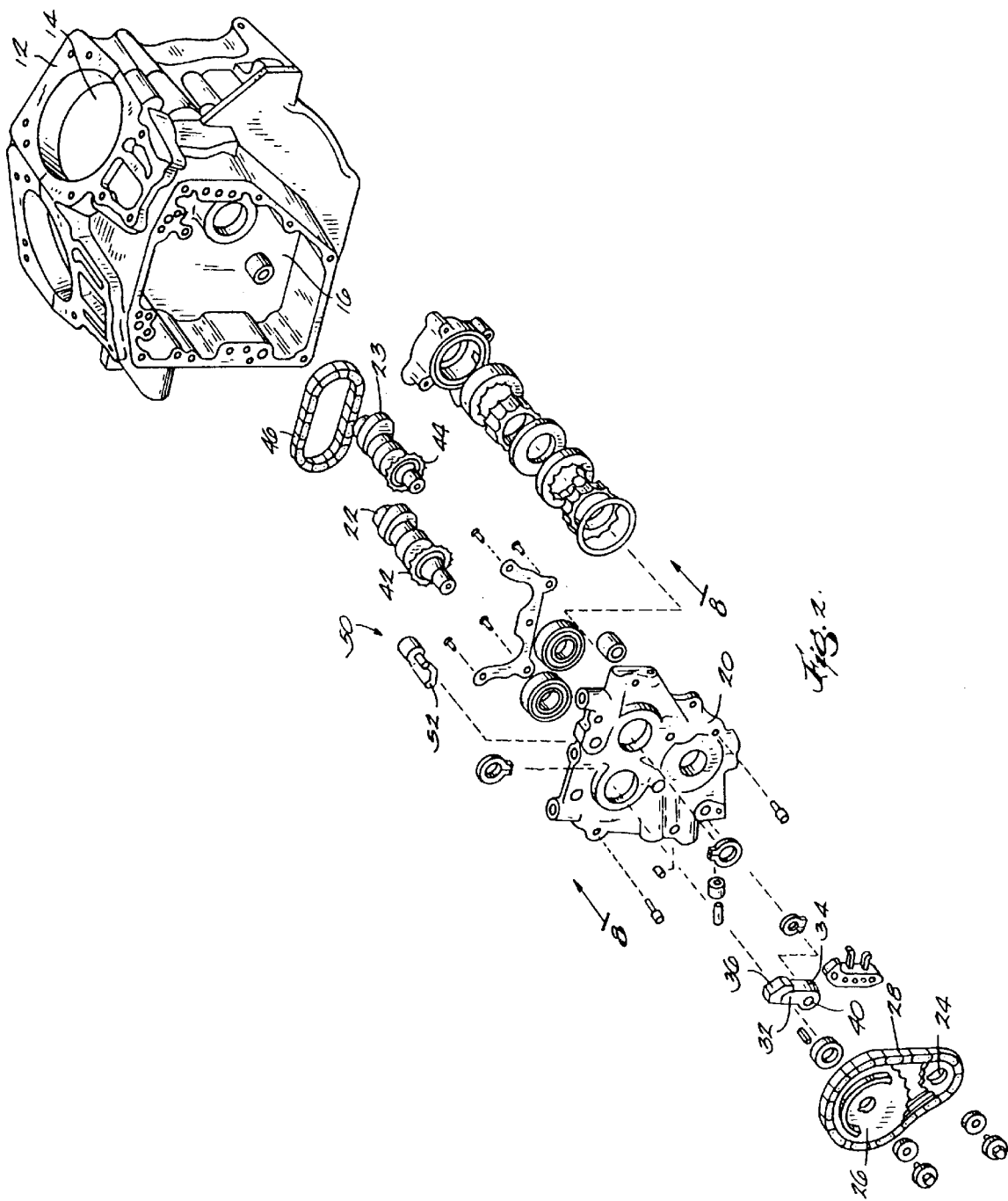

MOTORCYCLE CAM DRIVE TENSIONER

FIELD OF THE INVENTION

The invention relates to tensioners for drive systems in motorcycle internal combustion engines.

BACKGROUND

Motorcycle engines include intake and exhaust valves that are commonly actuated by rotating cams mounted on one or more camshafts. The camshafts are usually driven by the crankshaft, either via meshing gears or via flexible drive elements such as chains or belts.

When a flexible drive element is used, it is important that the drive element be maintained under tension to avoid slapping of the element and to prevent the element from slipping relative to the camshaft or crankshaft. Tensioning of the drive element is frequently accomplished using a tensioner that applies a continuous force on the drive element. The tensioner can include a rotating shoe that spins as it contacts the drive element, or a static shoe that slides relative to the drive element. In either design, wear of the shoe is a concern.

Prior art tensioners are generally made of steel or another metallic substance. From time to time these tensioners wear down due to friction between the drive chain and the tensioner.

SUMMARY OF THE INVENTION

The present invention provides a motorcycle engine having an improved cam tensioning system. The engine comprises an engine housing, a crankshaft mounted for rotation within the housing, a camshaft mounted for rotation within the housing, a flexible element (e.g., a chain) coupling the camshaft to the crankshaft, and a tensioner mounted adjacent the flexible element. The tensioner includes a biasing member and a shoe made of a polyimide polymer (e.g., Vespel, a trademark of E.I. DuPont de Nemours). The biasing member biases the shoe into contact with the flexible element.

In one embodiment, the tensioner further includes a support member supporting the shoe, in which case the biasing member biases the support member. Preferably, the support member includes two side panels and a shaft that pivotally supports the side panels, and the biasing member is positioned around the shaft and between the side panels. The engine can further include a cam support plate supporting an end of the camshaft, and the support member can be mounted (e.g., pivotally) to the cam support plate. The biasing member preferably comprises a coil spring. For example, the coil spring can be made from a wire having a quadrangular cross section.

BRIEF DESCRIPTION OF THE DRAWINGS

FIG. 1 is a partially exploded view of a motorcycle engine incorporating a tensioner according to the present invention.

FIG. 2 is an exploded view of a portion of the engine of FIG. 1.

DETAILED DESCRIPTION

Figure 4:
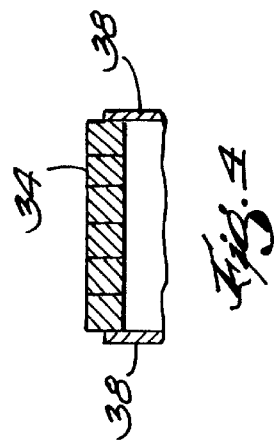
FIG. 4 is a cross section taken along line 4—4 in FIG. 3.

FIG. 1 illustrates a motorcycle internal combustion engine 10 including an engine housing 12 that generally defines a crankcase 14 and a cam chest 16. A crankshaft 18 is supported for rotation within the crankcase 14. Housed within the engine 10 housing is a camshaft support plate 20 having first and second sides. The first side of the camshaft support plate 20 at least partially defines the cam chest 16. The camshaft support plate 20 supports a pair of camshafts 22, 23 for rotation within the cam chest 16. The camshafts 22, 23 are generally parallel to one another and generally parallel to the crankshaft 14.

The camshafts 22, 23 and the crankshaft 14 extend through the camshaft support plate 20 from the first side to the second side. One end of the crankshaft is connected to a first timing gear 24 adjacent the second side of the camshaft support plate 20. The first timing gear 24 may be, for example, integrally formed with the crankshaft 14, keyed to the crankshaft 14, or otherwise mounted on the crankshaft 14 for rotation the crankshaft 14.

A second timing gear 26 having twice the diameter of the first timing gear 24 is mounted on an end of the first camshaft 22 adjacent the second side of the camshaft support plate 20. A flexible drive element 28 couples the first timing gear 24 to the second timing gear 26, causing the first camshaft 22 to rotate at half the rate of the crankshaft 14. The drive element 28 may be, for example, a chain, a cable, or a belt.

Figure 3:
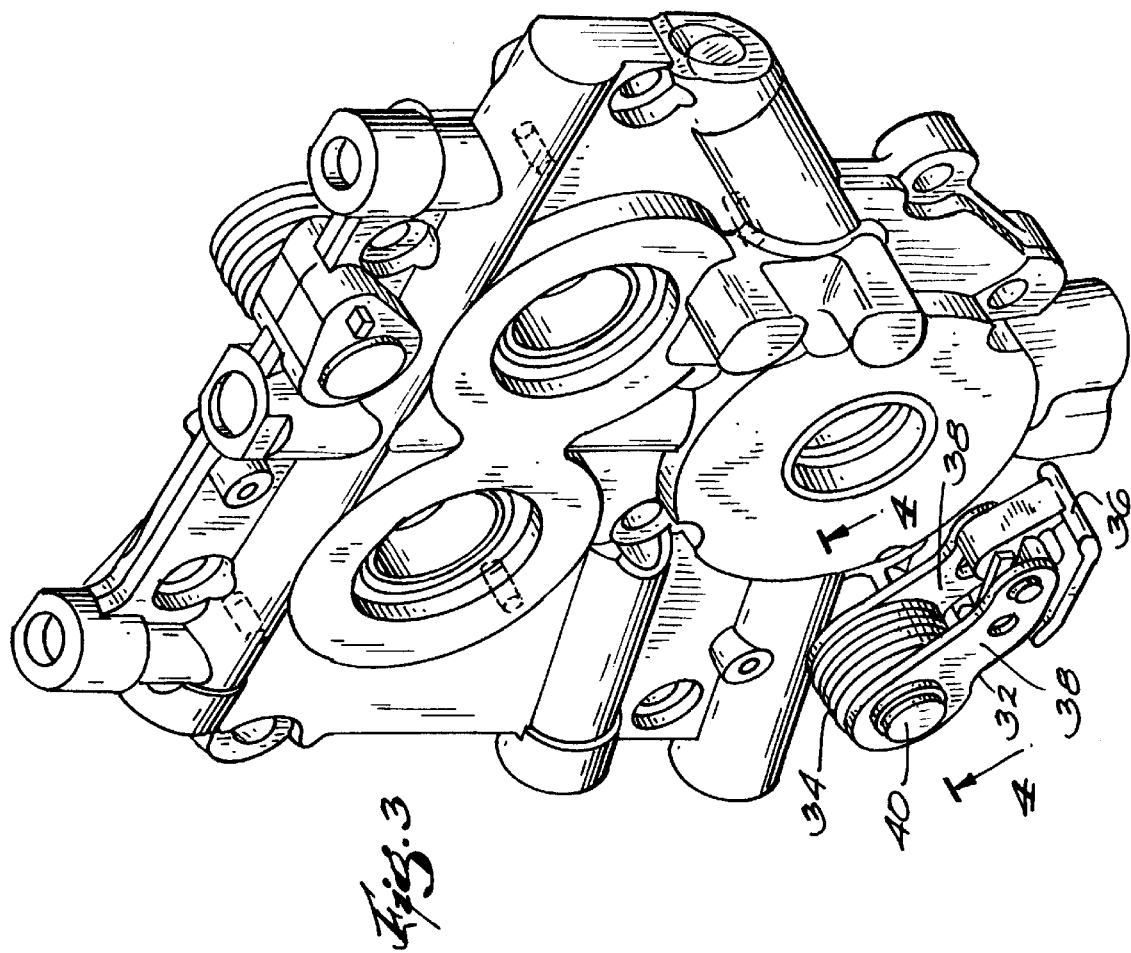
FIG. 3 is a perspective view of a cam support plate with the tensioner mounted thereon.

Mounted adjacent the drive element 28 is a first tensioner 30. The first tensioner 30 includes a support member 32, a biasing member 34, and a shoe 36. The illustrated support member 32 includes two side panels 38 and a shaft 40 interconnecting the side panels 38 (FIGS. 3 and 4). The shaft 40 is pivotally mounted to the cam support plate 20.

The biasing member 34 biases the support member 32 in a rotational direction toward the drive element 28. The biasing member 34 preferably is a coil spring that is positioned around the shaft 40 and between the side panels 38 to protect it from contamination. It has been found that making the coil spring from a wire material having a quadrangular or square cross section (i.e., a opposed to a round cross section) provides a coil spring with enhanced torsional properties (see FIG. 4).

The shoe 36 is mounted on the side panels 38 of the support member 32, and is made of a polyimide polymer material, which may be, for example, Vespel. It has been discovered that this material provides excellent wear resistance, heat resistance, low friction, and self-lubrication.

In operation, the biasing member 34 biases the support member 32 toward the drive element 28, causing the shoe 36 to contact the drive element 28 and take slack out of (i.e., tension) the drive element 28.

A first transfer gear 42 is mounted on the first camshaft 22 and a second transfer gear 44 is mounted on the second camshaft 23. The first and second transfer gears 42, 44 are mounted for rotation with the first and second camshafts 22, 23, respectively, adjacent the second side of the camshaft support plate 20, within the cam chest 16. A transfer element 46, which may be, for example, a chain, a cable, or a belt, couples the first and second transfer gears 42, 44.

A second tensioner 50 is mounted adjacent to the transfer element 46. The second tensioner 50 is similar in design to the first tensioner 30. For example, the shoe 52 of the second tensioner 50 includes Vespel. The second tensioner 50 is designed to contact the transfer element 46 to take slack out (i.e., tension) the transfer member 46.

It should be noted that alternative embodiments to those illustrated are contemplated. For example, the first and second timing gears 24, 26, and the first and second transfer gears 42, 44 may be replaced with pulleys or sprockets. Also, the drive element 28 in the illustrated embodiment is a chain, but may instead be a belt, for example. Also, the support member 32 and shoe 36 for each of the first and second tensioners 30, 50 may be made as one piece in alternative embodiments. In the illustrated embodiment, the first and second tensioners 30, 50 are mounted on the camshaft support plate 20, but the tensioners may be mounted elsewhere on the engine. For example, the tensioners may be mounted directly to the engine housing.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A motorcycle engine comprising:

an engine housing;

a crankshaft mounted for rotation within said housing;

a camshaft mounted for rotation within said housing;

a flexible element coupling said camshaft to said crankshaft; and a tensioner mounted adjacent said flexible element, said tensioner including:

a biasing member made from a wire having a quadrangular cross section; and a shoe made of a polyimide polymer, wherein said biasing member biases said shoe into contact with said flexible element.

2. A motorcycle engine as claimed in claim 1, wherein said camshaft is a first camshaft, said flexible element is a first flexible element, and said tension is a first tensioner having a first biasing member and a first shoe, and wherein said engine further includes:

a second camshaft mounted for rotation within said housing;

a second flexible element coupling said first camshaft to said second camshaft; and a second tensioner mounted adjacent said second flexible element, said second tensioner including:

a second biasing member; and a second shoe made of a polyimide polymer, wherein said second biasing member biases said second shoe into contact with said second flexible element.

3. A motorcycle engine as claimed in claim 1, wherein said flexible element comprises a chain.

4. A motorcycle engine as claimed in claim 1, wherein said tensioner comprises a support member supporting said shoe, wherein said biasing member biases said support member.

5. A motorcycle engine as claimed in claim 4, wherein said support member includes two side panels, and wherein said biasing member is positioned between said side panels.

6. A motorcycle engine as claimed in claim 4, wherein said engine further comprises a cam support plate supporting an end of said camshaft, wherein said support member is mounted to said cam support plate.

7. A motorcycle engine as claimed in claim 6, wherein said tensioner is pivotally mounted to said cam support plate.

8. A motorcycle engine as claimed in claim 1, wherein said biasing member comprises a coil spring.

9. A motorcycle engine comprising:

an engine housing;

a crankshaft mounted for rotation within said housing;

a camshaft mounted for rotation within said housing;

a flexible element coupling said camshaft to said crankshaft; and a tensioner mounted adjacent said flexible element, said tensioner including:

a biasing member made from a wire having a quadrangular cross section; and a shoe, wherein said biasing member biases said shoe into contact with said flexible element.

* * * * *